United States Patent [19]

Hiramatsu

[11] Patent Number: 4,668,961

[45] Date of Patent: May 26, 1987

[54] RECORDING APPARATUS

[75] Inventor: Soichi Hiramatsu, Yokohama, Japan

[73] Assignee: Canon Kabushiki Kaisha, Tokyo, Japan

[21] Appl. No.: 723,927

[22] Filed: Apr. 16, 1985

[30] Foreign Application Priority Data

Apr. 20, 1984 [JP] Japan .................................. 59-79916
Apr. 20, 1984 [JP] Japan .................................. 59-79917

[51] Int. Cl.$^{4}$ .............................................. G01D 15/10

[52] U.S. Cl. ................................ 346/76 PH; 346/105; 400/120; 400/323

[58] Field of Search ........................... 346/76 PH, 105; 400/120, 224, 323, 323.1, 231, 233, 207, 208; 214/216 PH

[56] References Cited

U.S. PATENT DOCUMENTS 728,050 5/1903 Turner ................................ 400/224

FOREIGN PATENT DOCUMENTS 2226394 5/1972 Fed. Rep. of Germany ... 400/323.1
0120385 2/1980 Japan ................................ 400/323.1

OTHER PUBLICATIONS

IBM Tech Disc. Bulletin, vol. 23, No. 4, Sep. 80, pp. 1517-1520, "Ribbon Feed for Bidirectional Printer", by Dials.

*Primary Examiner*—Arthur G. Evans
*Attorney, Agent, or Firm*—Fitzpatrick, Cella, Harper & Scinto

[57] ABSTRACT

A recording apparatus includes supply and take-up reels stored in a cassette case, a print head and a carriage. An ink ribbon housed in the cassette case can be fed from the supply reel in both the forward and reverse directions guided by means of guide rollers. The print head can be movable along print paper in a direction perpendicular to the forward and reverse directions so as to press portions of the ink ribbon fed in the forward and reverse directions against the print paper so as to perform printing. The print head and the cassette case are mounted on the carriage. Thus, since printing can be performed by driving the supply reel in a single direction, a ribbon driving system can be simplified, resulting in low cost.

32 Claims, 12 Drawing Figures

SET COUNTER TO ZERO
S30
HEAD LOCATED IN LOWER ROW ?
S31
NO
SHIFT HEAD TO LOWER ROW
S32
YES
CONTENT OF COUNTER EVEN NUMBER ?
S33
NO
YES
PRINT D1 PORTION
S34
PRINT D2 PORTION
S42
SHIFT HEAD TO UPPER ROW
S35
SHIFT HEAD TO UPPER ROW
S43
FEED PRINT PAPER BY THE AMOUNT CORRESPONDING TO ONE LINE AND HALF OF A DOT
S36
FEED PRINT PAPER BY THE AMOUNT CORRESPONDING TO ONE LINE AND HALF OF A DOT
S44

RECORDING APPARATUS

BACKGROUND OF THE INVENTION

1. Field of the Invention

The present invention relates to a recording apparatus for recording by reciprocally moving a recording means.

2. Description of the Prior Art

A transfer recording apparatus such as a thermal transfer printer, a print head and an ink ribbon supply means are mounted on a carriage which is moved along paper. In a thermal transfer printer, a plurality of heat-generating elements mounted on a print head are generally driven in accordance with a print pattern signal.

The ink ribbon supply means comprises a supply reel and a take-up reel to supply an ink ribbon at a speed synchronous with the print speed. In general, a ribbon cassette which synchronously drives the takeup reel is used.

In a recording apparatus such as a printer, printing is performed only while the carriage is moved in one direction (print direction) and printing is not performed while the carriage is moved in the other direction (return direction). However, in order to improve the print efficiency, bi-directional printing in which printing is performed in both directions is being studied.

FIG. 1 shows a conventional cassette-type ink ribbon supply means. A supply reel 2 and a take-up reel 3 are arranged inside a cassette case 1. The cassette is mounted on a carriage (not shown). When the carriage is moved in a direction indicated by arrow F and a print head 4 is actuated, the take-up reel 3 is driven synchronously in a direction indicted by arrow A so as to feed an ink ribbon 5 in a direction indicated by arrow B.

When bi-directional print is performed by the ink ribbon supply means (ribbon cassette) as shown in FIG. 1, printing is performed also while the carriage is being moved in a direction indicated by arrow R. Therefore, the ink ribbon 5 must be supplied also in a direction indicated by arrow C. For this purpose, the supply reel 2 must be driven in a direction indicated by arrow D to serve as take-up reel.

In the conventional ink ribbon supply means as shown in FIG. 1, both the supply reel 2 and the take-up reel 3 must be driven, and the drive system therefore becomes complex in structure.

A portion of the ink ribbon which has been used for printing cannot be reused for the same purpose. For this reason, only after the ink ribbon 5 is fed for one line at an end position after printing one line in the forward direction (direction indicated by arrow F), printing in the reverse direction (direction indicated by arrow R) cannot be started. Similarly, at an end position after printing one line in the reverse direction, printing in the forward direction cannot be started until the ink ribbon is taken up for one line. For this reason, take-up of the ink ribbon is time-consuming and printing speed is lowered.

SUMMARY OF THE INVENTION

It is an object of the present invention to provide a recording apparatus which can perform bi-directional printing at high speed.

It is another object of the present invention to improve the take-up efficiency of an ink ribbon.

It is still another object of the present invention to eliminate wasteful use of an ink ribbon.

It is still another object of the present invention to provide a ribbon cassette suitable for bi-directional printing.

It is still another object of the present invention to provide stable, high-quality printing at high speed.

The above and other objects, features and advantages of the present invention will become apparent from the following description taken in conjunction with the accompanying drawings.

DETAILED DESCRIPTION OF THE PREFERRED EMBODIMENTS

Figure 1:
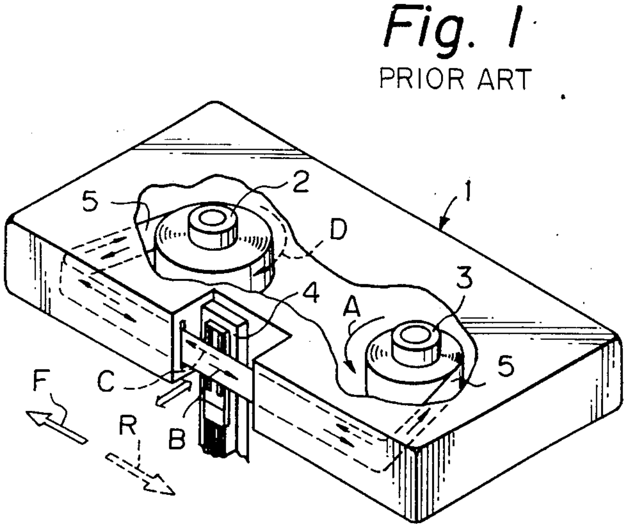
Fig. 1 PRIOR ART
FIG. 1 is a perspective view of a main part of a conventional thermal printer.
Figure 2:
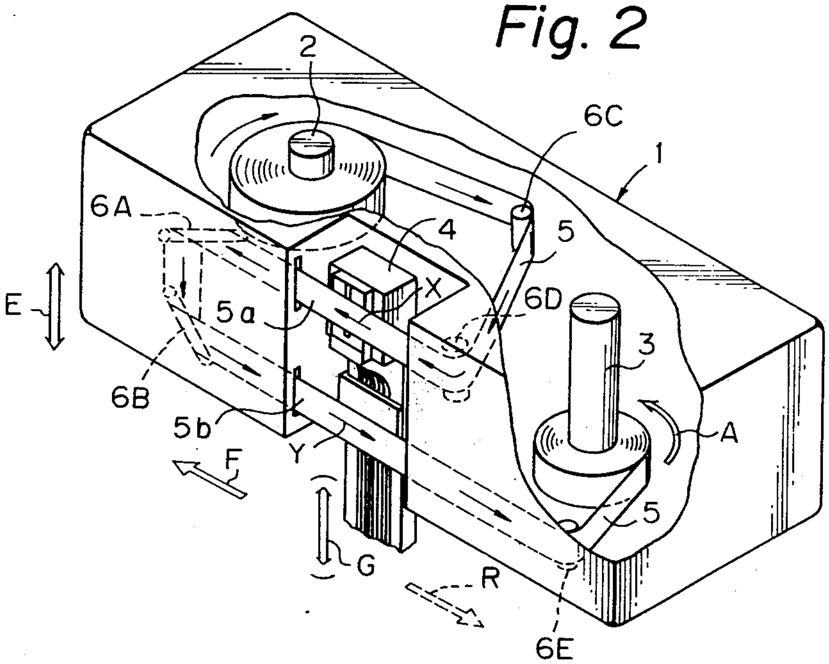
FIG. 2 is a perspective view of a main part of a first embodiment of the present invention.

FIG. 2 shows a first embodiment of the present invention for performing bi-directional printing.

Referring to FIG. 2, a supply reel 2 and a take-up reel 3 are mounted inside a cassette case 1. An ink ribbon 5 supplied from the supply reel 2 to the take-up reel 3 is exposed at two regions or paths 5a and 5b which oppose print paper and a print head (thermal head) 4, and in which the ink ribbon 5 is driven in opposite directions. The print head 4 has recording elements for printing at least one character in a direction perpendicular to the direction along which a carriage is driven. At the same time, the ink ribbon 5 is mounted such that the ink-coated surface faces the opposite side (forward side in the figure) of the print head 4. The print head 4 can be vertically shifted. In the example illustrated in FIG. 2, the ink ribbon 5 on the supply reel 2 has the ink-coated surface at its outer side. At the upper row of the print head 4, the ink ribbon 5 is first guided by guide rollers 6C and 6D so as to be driven in a direction X which is the same as a carriage drive direction F during forward printing. Thereafter, as shown in FIG. 2, the ink ribbon 5 is inverted by guide rollers 6A and 6B and guided along the lower row in a direction Y which is the same as the carriage drive direction R during return printing. Then, the ink ribbon 5 is taken up by the take-up reel 3 from a guide roller 6E. The pitch between the paths 5a and 5b of the ink ribbon corresponds to one line feed distance on print paper.

The supply reel 2 is a reel which freely rotates with a suitable frictional force. The take-up reel 3 is driven in synchronism with a moving speed (constant speed) of the carriage through a drive shaft (not shown) on the carriage.

The print head 4 is supported so that it can be vertically shifted along a direction indicated by arrow G with respect to the carriage. During return printing (R direction), the print head 4 is at its upper position as shown in FIG. 2. In this state, the print head 4 and the upper path of the ink ribbon 5 are aligned with each other. During forward printing (F direction), the print head 4 is at its lower position. In this state, the print head 4 and the lower path are aligned with each other. The print head 4 is thus vertically shifted in a direction perpendicular to the carriage moving direction in accordance with the print direction.

Instead of vertically moving the print head 4, the cassette case 1 can be mounted on the carriage 1 so that the case 1 is vertically movable in a direction indicated by arrow E. Thus, the cassette case 1 can be adjusted to align the print head 4 with the desired ink ribbon path in accordance with the print direction.

Figure 3:
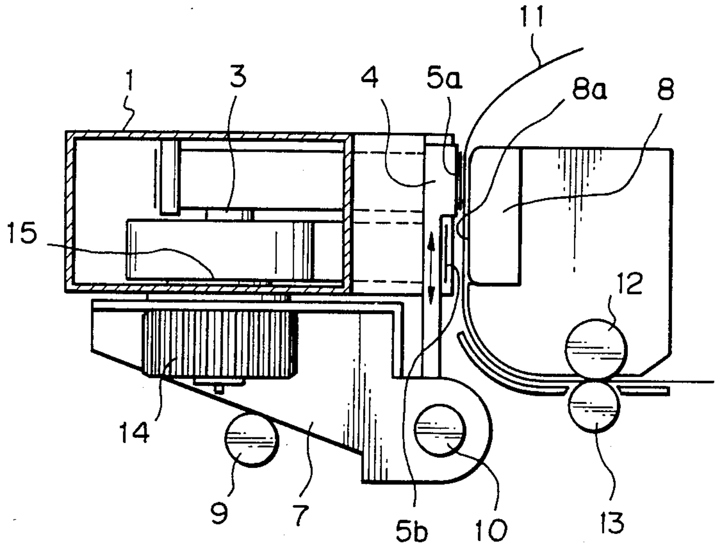
FIG. 3 is a sectional view when a ribbon cassette is mounted on a carriage.

FIG. 3 is a sectional view of a printing arrangement. The carriage is guided by guides 9 and 10 with respect to a flat platen 8, and is reciprocated along a direction perpendicular to the sheet of the drawing, i.e., along the platen 8 and print paper 11. As can be seen from FIG. 8, the platen 8 has a flat surface portion 8*a* having a width corresponding to two print lines. When the cassette case 1 is mounted on a carriage 7, the flat surface portion 8*a* opposes the upper and lower rows 5*a* and 5*b* of the ink ribbon. The print paper 11 supplied in front of the platen is clamped between a drive roller 12 and a pinch roller 13 and is conveyed upward.

In the illustrated state, the print head 4 opposes the upper path 5*a* of the ink ribbon 5 and is urged against the platen through the print paper. However, during forward print (F direction), the print head 4 is shifted downward and urges the lower path 5*b* against the platen 8 through the print paper.

A motor 14 for taking up the ink ribbon 5, is fixed on the carriage 7 and drives the take-up reel 3 through a friction clutch 15. The rotational speed of the motor 14 is set such that even when no ink ribbon is wound around the take-up reel 3, the ink ribbon take-up speed per unit time is larger than the moving speed of the carriage 7. The difference between the tape take-up speed of the motor 14 and the moving speed of the carriage 7 is absorbed as slippage by a friction clutch 15. In order to cause slippage of the friction clutch 15, the ink ribbon 5 is urged against the platen 8 by the print head 4. In this manner, in either forward or return printing, the ink ribbon 5 is conveyed at the same speed as that of the carriage 7 so that no relative displacement between the ink ribbon 5 and the print paper 11 occurs.

In skip printing wherein a portion of a line is not printed and the portion is skipped, the ink ribbon need not be taken up. In such a case, the print head 4 is moved to the up position relative to the platen 8, and rotation of the motor 14 is stopped.

In the embodiment described with reference to FIGS. 2 and 3, bi-directional printing can be performed by simply driving a single reel, i.e., the take-up reel 3, in a direction indicated by arrow A. Thus, the ink ribbon drive system can be simplified, and manufacturing cost can be reduced.

An extra operation is not required to perform bi-directional printing, e.g., taking up or feeding of the ink ribbon 5 at an end position of forward or return printing. Therefore, the printing speed and hence printing efficiency in bi-directional printing can be improved.

Since bi-directional print is performed by driving the single, continuous ink ribbon 5 by unidirectional drive of the take-up reel 3, even when there is a difference in the amount of forward and return printing, the ink ribbon 5 can be independently used up, and wasteful use of the ink ribbon can be prevented.

Figure 4:
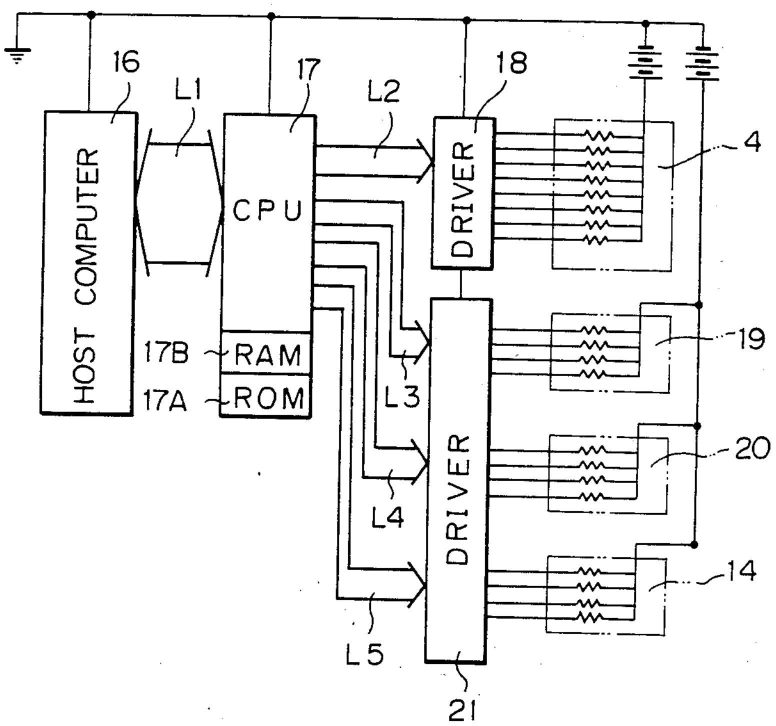
FIG. 4 is a circuit diagram of the embodiment of the present invention.
Figure 5:
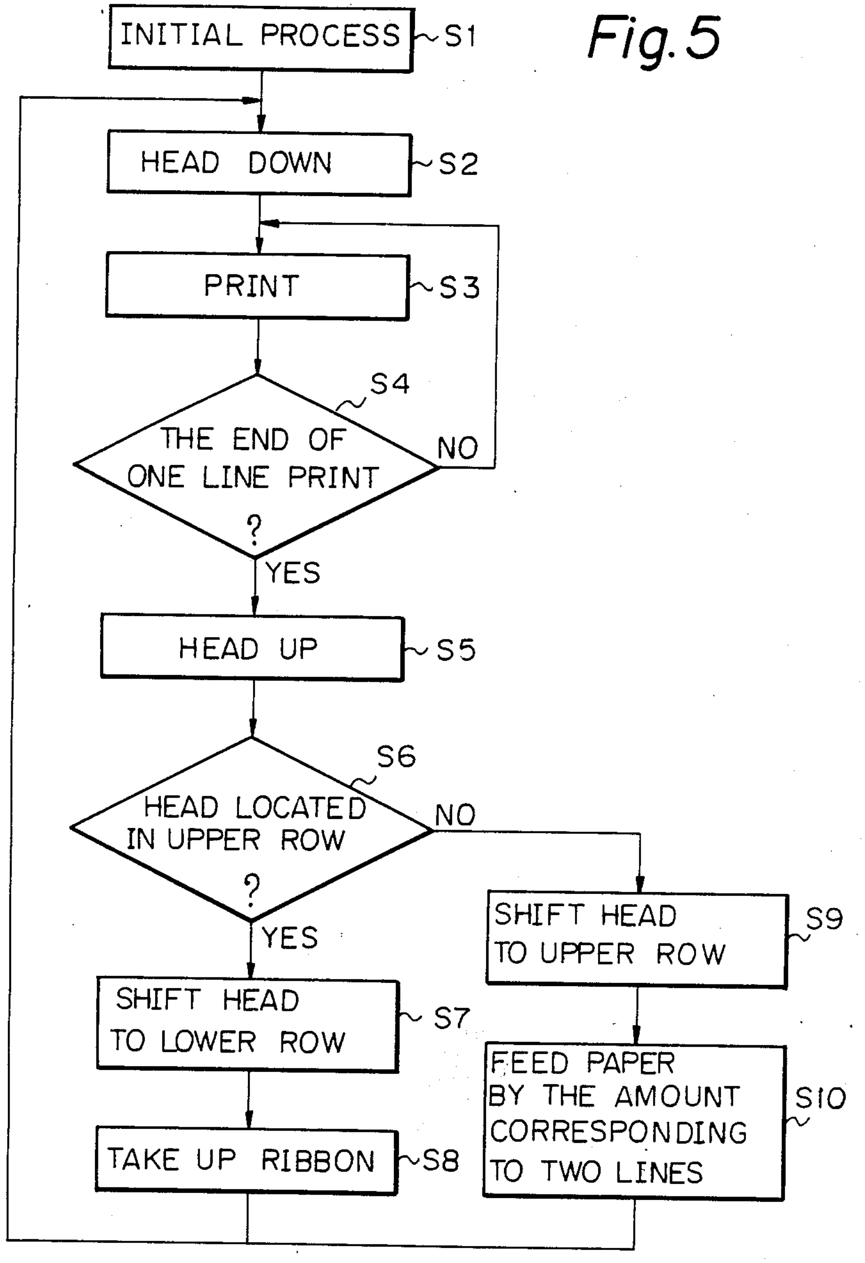
FIG. 5 is a flow chart showing the operation of the first embodiment of the present invention.

FIG. 4 is a simplified block diagram of a control section of the printer in the embodiment shown in FIG. 2 and in each embodiment to be described later. FIG. 5 is a flow chart for when bi-directional printing is performed.

Referring to FIG. 4, in response to print data supplied from a host computer 16 through a line L1, a CPU 17 generates a control signal through a line L2 to control a head driver 18 and to drive predetermined dots of the head 4. The CPU has a ROM 17A for storing a program and a RAM 17B. A motor 19 for driving the carriage 7, a paper feed motor 20 and a ribbon take-up motor 14 are respectively driven by a motor driver 21 controlled by control signals supplied from the CPU 17 through lines L3, L4 and L5, respectively.

The print operation of the printer will be described with reference to FIG. 5. After initial process is performed in step S1, the print head 4 is urged against the print paper 11 and one line of printing is performed in steps S2 and S3. During printing, the head driver 18 and the motor driver 21 drive the print head 4, the carriage motor 19 and the ribbon take-up motor 14. The initial process in step S1 is performed upon turning on of the power switch (not shown) and the process includes return of the carriage to the home position and resetting of various counters and memories required for print control.

When one-line print is completed (step S4), the urging force of the print head 4 against the paper sheet is released and the head 4 is set in its upper position (step S5). In step S6, it is checked if the print head 4 is at its upper row. As shown in FIG. 2, if the print head 4 is located at its upper position and the carriage has completed printing by moving in direction R, the print head 4 is shifted to its lower row position (step S7).

When the print head 4 is shifted to its lower row position, it opposes the lower path 5*b* of the ink ribbon. A portion of the ribbon which has been subjected to printing is located at the path 5*b*. Therefore, in step S8, the ink ribbon 5 is taken up for a distance between the upper path 5*a* opposing the print head 4 and the lower path 5*b* opposing the print head 4, and an unused portion of the ink ribbon is opposed to the print head 4, and the flow returns to step S2.

When it is determined in step S6 that the print head 4 is at its lower row position and printing has been performed by driving the carriage in the F direction, the print head 4 is shifted to the upper row position (step S9) and the paper sheet is fed for a length corresponding to two lines (step S10). Thereafter, printing in the opposite direction is started in step S2.

When the above printer is used, even if only a single ribbon take-up motor is used and the ink ribbon is taken up only in one direction, bi-directional printing can be performed. According to this embodiment, the ink ribbon can be used without waste.

Figure 6:
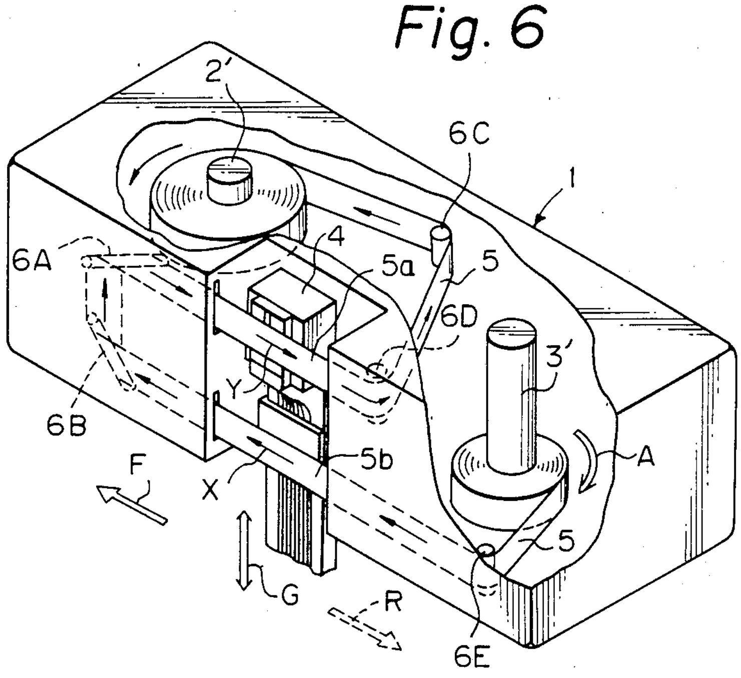
FIG. 6 is a perspective view of a main part of a second embodiment of the present invention.

FIG. 6 shows a second embodiment of the present invention. This embodiment is similar to the first embodiment except that a lower reel in a cassette case is a supply reel 3' and an upper reel is a take-up reel 2', and the conveying direction of the ink ribbon is opposite to that of the first embodiment. The same reference numerals as in FIG. 2 denote the same parts in FIG. 6. Since the second embodiment has such a construction, the upper path 5*a* of the ink ribbon 5 is fed in a direction Y the same as the return direction (R direction) of the carriage, and the lower path 5*b* of the ink ribbon 5 is fed in the forward direction (F direction) of the carriage.

Figure 7:
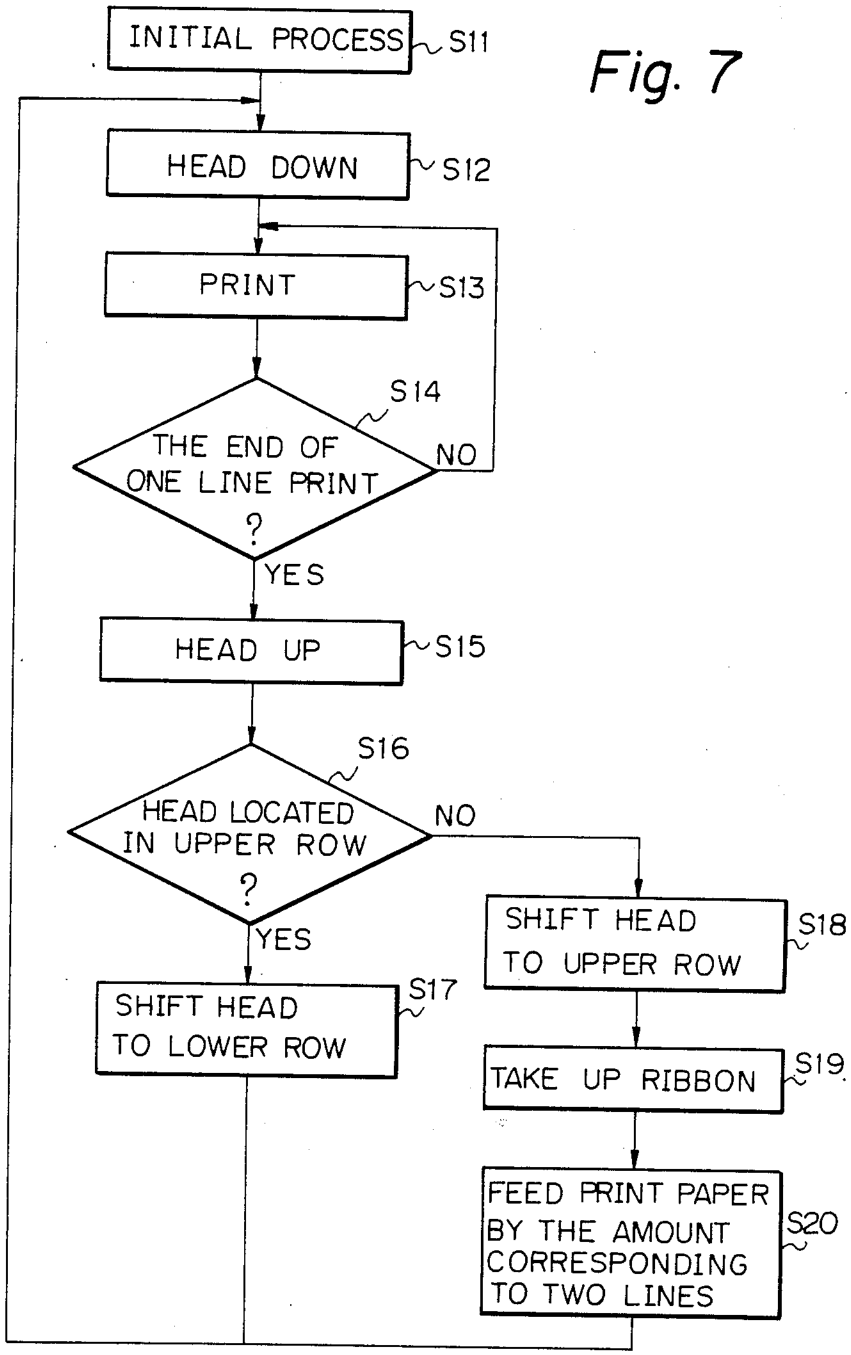
FIG. 7 is a flow chart showing the operation of the second embodiment of the present invention.

FIG. 7 is a flow chart of the operation of the second embodiment of the present invention. Steps S11 to S16 in FIG. 7 are the same as steps S1 to S6 in FIG. 5. In step S16, when it is determined that the print head 4 is at the upper row, the print head 4 is shifted to the lower row position in step S17 to be opposed to the lower path 5*b* of the ink ribbon. Thereafter, without performing ribbon and paper feed, the flow returns to step S12.

When it is determined in step S16 that the print head 4 is at its lower row position, the head is shifted to the upper row position (step S18), a portion of the ink ribbon between the upper path 5*a* and the lower path 5*b* is taken up (step S19), and the print paper 11 is line fed for a distance corresponding to two lines (step S20). In this manner, since take-up of ink ribbon and paper feed are performed simultaneously, print time can be reduced.

Figure 8:
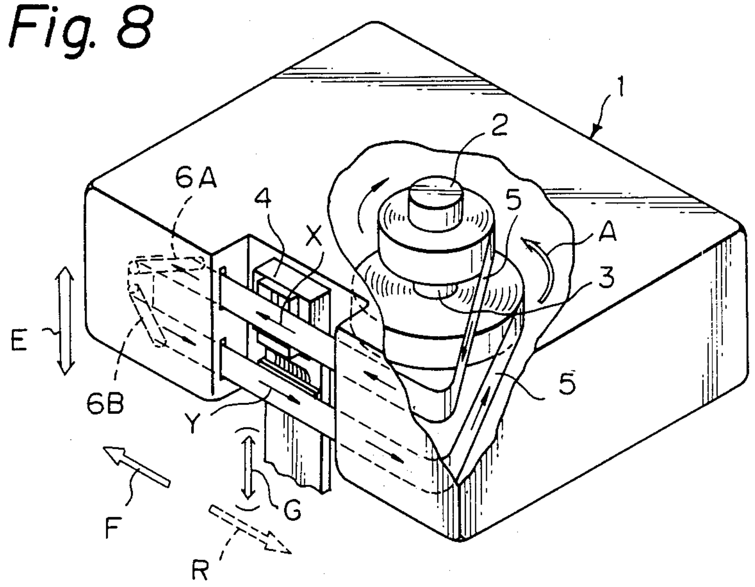
FIG. 8 is a perspective view of a main part of a third embodiment of the present invention.

FIG. 8 shows a third embodiment. This embodiment is different from the first embodiment in that a supply reel 2 and a take-up reel 3 are arranged coaxially and an ink ribbon is guided along upper and lower paths of substantially the same configuration. The remaining details of this embodiment are substantially the same as that shown in FIG. 2. The same reference numerals as in FIG. 2 denote the same parts in FIG. 8, and a detailed description thereof will be omitted.

As in the case of the embodiment shown in FIG. 2, the take-up reel 3 is rotated by a drive shaft (not shown) on the carriage, and the supply reel 2 is freely rotatable. Therefore, the supply reel 2 can be rotatably mounted on a shaft extending from a cassette case 1, or can be rotatably fitted around an extending portion of the take-up reel 3.

In addition to the effects obtainable with the first and second embodiments, in accordance with the third embodiment, the volume of the cassette case 1 and required space can be reduced, and guide portions arranged along the guide path of the ink ribbon 5 can be used in common for the upper and lower paths.

Figure 9:
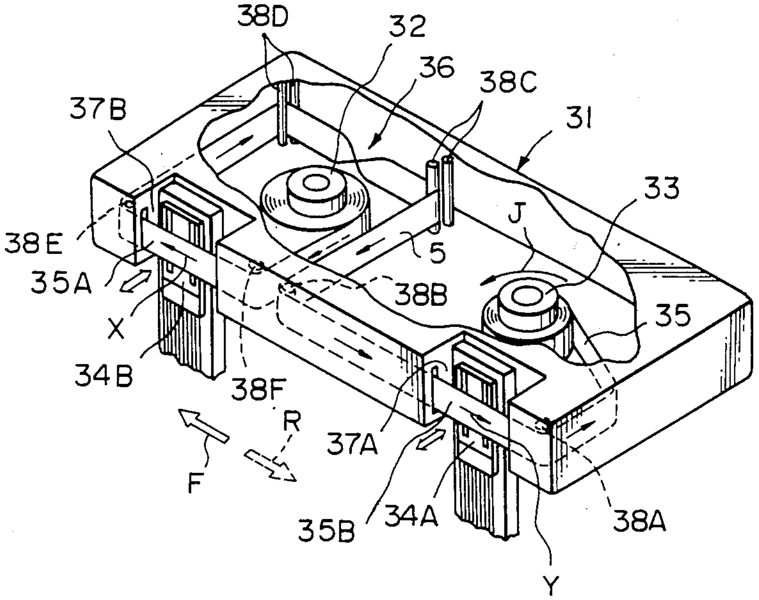
FIG. 9 is a perspective view of a main part of a fourth embodiment of the present invention.

FIG. 9 shows a fourth embodiment of the present invention. Referring to FIG. 9, a supply reel 32 and a take-up reel 33 are arranged in a cassette case 31. Two print heads 34A and 34B are mounted on a carriage such that they can be shifted between up and down positions (separated and urged) with respect to the two print heads 34A and 34B.

The two print heads 34A and 34B are mounted to have a predetermined distance therebetween along the printing direction. An ink ribbon 35 fed from the supply reel 32 to the take-up reel 33 is exposed in paths 35A and 35B opposing the heads 34A and 34B and is guided by guide rollers 38A to 38F in opposite directions (indicated by arrows) in these paths. When the take-up reel 33 is driven in a direction indicated by arrow J, the ink ribbon 35 supplied from the supply reel 32 is driven in a direction indicated by arrow X in the path 35A opposing the print head 34B and is then driven in a direction indicated by arrow Y in the path 35B opposing the print head 34A. Thus, the paths 35A and 35B are arranged substantially parallel to the moving direction of the print heads. Since ink is applied only to one surface of the ink ribbon (the outer side in the state that it is wound around the supply reel 32), in order to allow the ink surface of the ribbon to face outward (paper side) at the print head 34A, the ink ribbon 35 must be reversed at a suitable position between the print heads 34A and 34B. For this purpose, an inverting portion 36 is arranged between the guide rollers 38C and 38D.

When printing is to be performed, during forward printing by moving the carriage (not shown) in the direction F along paper (not shown), the print head 34B which prints in the return direction is kept at its upper position. Printing is performed by the print head 34A at a portion 37A (head opening) at which the ink ribbon 35 is moved in the Y direction. During return printing by moving the carriage in the R direction, the print head 34A for forward printing is moved to its upper position. Print is performed by the print head 34B at a portion 37B (head opening) at which the ink ribbon 35 is driven in the X direction.

In the embodiment shown in FIG. 9, a mechanism for vertically shifting the ribbon cassette or print heads is not required, and bi-directional printing can be performed by driving only one reel (only the take-up reel 33). Accordingly, the ink ribbon drive system can be simplified, and the cost can be reduced.

In the take-up operation of the ink ribbon for inverting the print direction at an end position of each line, the ink ribbon need not be taken up for a distance corresponding to one line as in conventional apparatus and need only be taken up for a short distance. Therefore, the print speed can be increased as compared to conventional apparatuses.

Bi-directional printing is performed so that paths of the ink ribbon in which it is driven in opposite directions are formed by driving a single, continuous ink ribbon 35 by uni-directional driving of the take-up reel 33, i.e., by proper guiding of the ink ribbon. Therefore, two vertically separated regions of the ink ribbon need not be provided by vertically shifting the cassette or print head by a special mechanism. Thus, a bi-directional transfer recording apparatus having excellent operability can be provided.

High-Quality Print

Recently, demand for improvement in print quality, i.e., an increase in print dot density, has arisen. However, if the dot density of a print head is simply increased, this results in high cost. In order to achieve high-quality printing, printing for one line is performed, and thereafter, print paper is fractionally fed so that printing can be made among dots which are already printed, thus increasing the dot density and achieving improvement in print quality.

Figure 10:
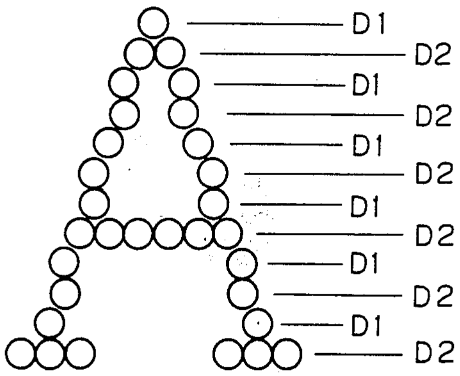
FIG. 10 is a view showing an example of high-quality printing.

FIG. 10 shows a letter formed by the above two-step printing. Referring to FIG. 10, dots D1 are formed by a first printing operation, and dots D2 are formed by a second printing operations after feeding the print paper by half a dot pitch.

Figures 11, 11A, 11B:
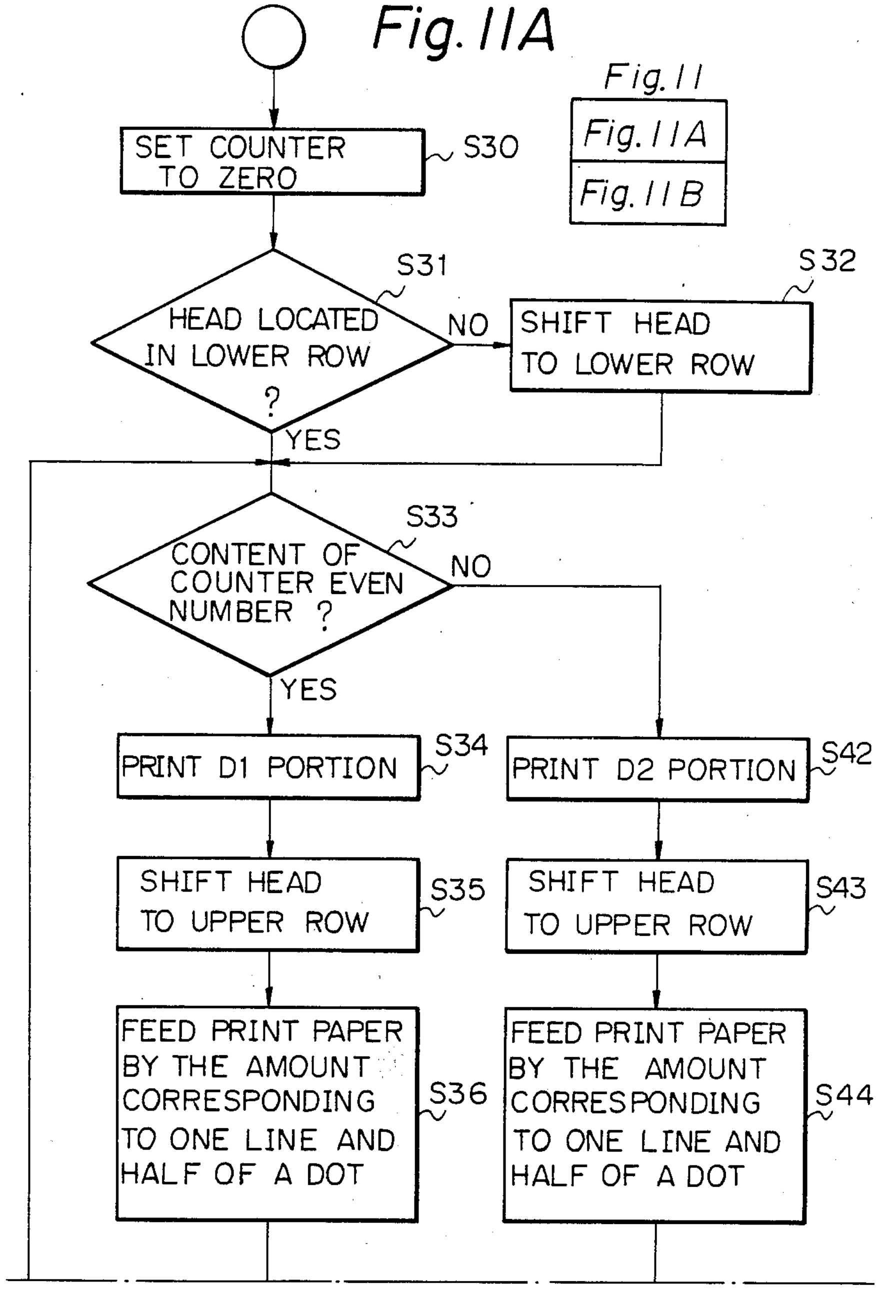
FIG. 11 composed of FIGS. 11A and 11B is a flow chart for explaining the method for performing high-quality printing shown in FIG. 10.
Figure 11B:
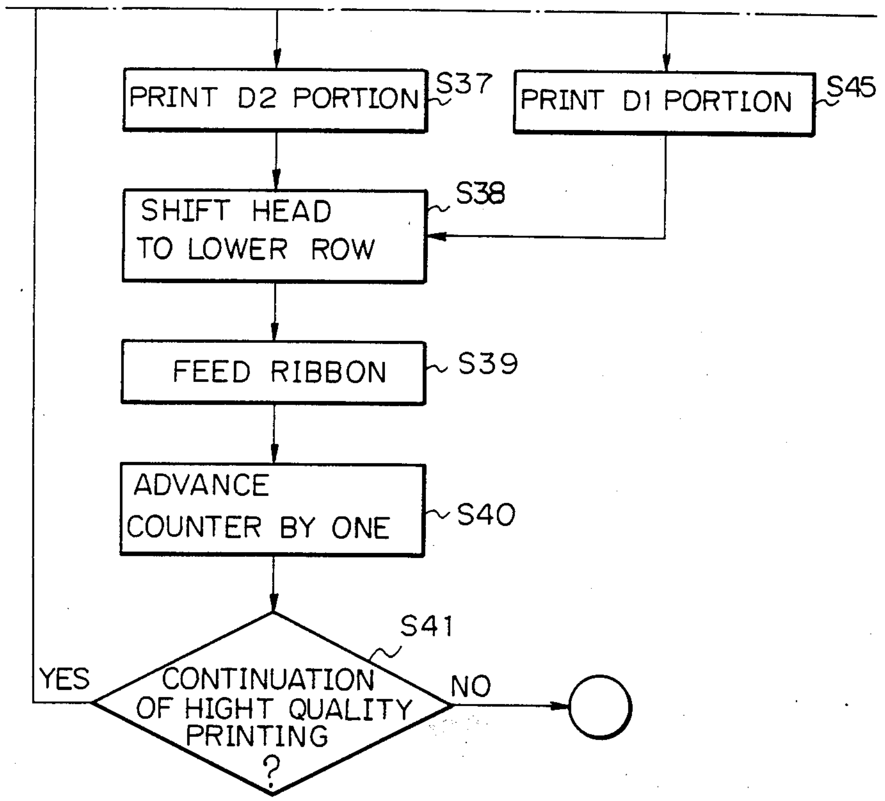

High-quality print according to this embodiment can be executed in accordance with a program shown in FIG. 11 composed of FIGS. 11A and 11B using the apparatus of the first embodiment described above. The program shown in FIG. 11 is stored in the ROM 17A in the CPU 17 in the block diagram shown in FIG. 4.

An operation for high-quality printing will be described hereinafter.

In a high-quality print mode, in step S30, a counter indicating the number of printed lines in this mode is set to zero. The counter is provided in the RAM 17B in the CPU 17. Thereafter, in steps S31 and S32, the print head is shifted so as to be located at a lower row position, thus setting a first print state. In step S33, the CPU checks if a content of the counter is an even number. For example, since the counter is initially set to zero, the flow advances to print processing in the lower row position. In first print in step S34, the pattern of the D1 portion in FIG. 10 is printed, and in step S35, the head is shifted to an upper row. In step S36, the print paper is fed by the length corresponding to one line (equal to a pitch between print regions between upper and lower rows) and to half a dot for performing second print among the pattern of the D1 portion. Then, the head is shifted to the upper row position, and the pattern of the D2 portion is printed in the D1 portion by the second print printing while moving the carriage in the reverse direction (step S37). When the patterns of the D1 and D2 portions are formed by such reciprocal printing, high-quality printing can be achieved, as shown in FIG. 10.

After the reciprocal printing, the head is returned to the lower row position (step S38), and the ink ribbon 5 is taken up by the pitch between the paths 5*a* and 5*b* (step S39). Thereafter, the counter is incremented by one. At this time, the print position of the lower row corresponds to a position at which the print paper is fed by a length corresponding to one line and half a dot with respect to the pattern formed by the above reciprocal printing.

After completing the high-quality printing mode, this routine ends in step S41, and when the high-quality print mode is continued, the flow returns to step S33. In this case, in step S33, the state of the counter is diffferent from that during the previous high-quality print, and the print position of the print paper is shifted by a pitch corresponding to half a dot. For this reason, since the content of the counter is an odd number, the flow advances to step S42. In the first printing performed upon moving the carriage in the forward direction (F direction), the pattern of the D2 portion in FIG. 10 is first printed, and the head is then shifted to the upper row (step S43). The print paper is fed by a length obtained by subtracting half a dot from one line corresponding to the pitch between the upper and lower rows (step 44). At this print position, the pattern of the D1 portion is formed by the second print upon moving the carriage in the reverse direction, thus forming the pattern shown in FIG. 10. Thus, the positional relationship between the print paper and the print head becomes the same as the initial position in the high-quality print mode.

In this manner, when the upper print data pattern (D1 portion) and the lower print data pattern (D2 portion) are alternately formed by forward and reverse printing for each line, the high-quality pattern shown in FIG. 10 can be precisely printed by one line pitch. The above control is characterized in that the print paper can always be fed once during printing for one line, and that a reverse paper feed operation is not included.

In the above embodiment, in the second printing, printing is performed in the dot pattern formed by the first printing. However, upper and lower patterns can be arbitrarily divided, and the present invention can be applied to any method in which a dot pattern is formed by reciprocal printing.

The present invention is not limited to the above embodiments. For example, in the above embodiments, the ink ribbon is stored in the cassette case. However, the ink ribbon need not be of a cassette type, and can be supplied and taken from/up by supply and take-up reels provided on the carriage.

The supply and take-up reels can be provided on a printer frame side other than the carriage.

The embodiments described above can be applied not only to a thermal transfer printer, but to various recording apparatus which transfer images on recording paper using an ink ribbon.

What I claimed is:

1. A recording apparatus for recording onto a recording medium by using an ink sheet carrying ink, said apparatus comprising:

- recording means reciprocally movable with respect to said recording medium, said recording means being provided for transferring the ink carried on said ink sheet onto the recording medium;
- means defining a first transfer position where the ink of said ink sheet may be transferred onto said recording medium; and a second transfer position which is separate from said first transfer position and where the ink may be also transferred onto said recording medium;
- first holding means for holding the ink sheet for recording;
- second holding means for holding the ink sheet which has been fed from said first holding means and thereafter used for recording;
- guide means for guiding the ink sheet fed from said first holding means, to said first transfer position, then to said second transfer position, and thereafter to said second holding means, said guide means guiding the ink sheet to said second transfer position in a direction opposite to the direction of guiding of the ink sheet to said first transfer position; and
- drive means for driving said ink sheet from said first holding means to said second holding means.

2. An apparatus according to claim 1, wherein said recording means is movable between said first and said second transfer positions.

3. An apparatus according to claim 1, wherein said recording means comprises means for forcing said recording means to assume said first and said second transfer positions.

4. An apparatus according to claim 1, wherein said recording means is provided for each of said transfer positions.

5. An apparatus according to claim 1, wherein said first and said second transfer positions are arranged one above the other.

6. An apparatus according to claim 1, wherein said first and said second transfer positions are vertically spaced from each other by a distance equal to a distance between two successive lines to be recorded.

7. An apparatus according to claim 1, further comprising means for controlling said drive means wherein after one line of recording is ended and before the succeeding line recording is started, said ink sheet is driven by a length equal to the ink sheet path length distance between portions opposing the first and the second transfer positions.

8. An apparatus according to claim 1, wherein said first and said second transfer positions are arranged in a direction generally parallel to the recording direction of said recording means.

9. An apparatus according to claim 1, wherein said first and said second holding means are arranged in a direction generally parallel to the recording direction of said recording means.

10. An apparatus according to claim 1, wherein said first and said second holding means are arranged one above the other.

11. An apparatus according to claim 1, wherein said ink sheet is driven only in one direction.

12. An ink sheet cassette provided with an ink sheet carrying ink and operable in conjunction with recording means for transferring ink from the ink sheet to a recording medium, said cassette comprising:

a first holding means for holding the ink sheet to be fed therefrom for recording;

a second holding means for holding the ink sheet fed from said first holding means; and guide means for guiding the ink sheet fed from said first holding means, to a first position, then to a second position separate from said first position, and thereafter to said second holding means, said guide means guiding the ink sheet to said second position in a direction opposite to a direction of guiding of the ink sheet to said first position; and said recording means being operable to transfer ink to the recording medium from said ink sheet at said first position and said second position.

13. A cassette according to claim 12, wherein said first and said second holding means are arranged in a direction generally parallel to said guiding of the ink sheet by said guide means.

14. A cassette according to claim 12, wherein said first and said second holding means are arranged one above the other.

15. A cassette according to claim 12, wherein at said first and said second positions said sheet is exposed to the outside of said cassette.

16. A recording apparatus for recording onto a recording medium by using an ink sheet carrying ink, said apparatus comprising:

means defining a first transfer position where the ink carried on said ink sheet may be transferred onto said recording medium; and a second transfer position which is separate from said first transfer position and where the ink carried on said ink sheet may be also transferred onto said recording medium;

first holding means for holding the ink sheet to be fed therefrom;

second holding means for holding the ink sheet which has been fed from said first holding means and thereafter has been used for recording;

recording means mounted for reciprocal movement along said recording medium and capable of assuming said first and said second transfer positions, said recording means being provided for transferring the ink carried on said ink sheet onto the recording medium in the form of dot lines;

control means for controlling said recording means such that said recording means records dot lines at said second transfer position onto the recording medium between dot lines recorded at said first transfer position;

guide means for guiding said ink sheet fed from said first holding means, to said first transfer position, to said second transfer position, and thereafter to said second holding means; and drive means for driving said ink sheet from said first holding means to said second holding means.

17. An apparatus according to claim 16, wherein said recording means is movable between said first and said second transfer positions.

18. An apparatus according to claim 16, wherein said recording means comprises means for forcing said recording means to assume said first and said second transfer positions.

19. An apparatus according to claim 16, wherein said first and said second transfer positions are arranged one above the other.

20. An apparatus according to claim 16, wherein said first and said second transfer positions are vertically spaced from each other by a distance equal to a distance between two successive lines to be recorded.

21. An apparatus according to claim 16, wherein after a line of recording is ended and before the succeeding line recording is started, said ink sheet is fed by a length equal to the ink sheet path length distance between said first and said second transfer positions.

22. An apparatus according to claim 16, wherein said first and said second transfer positions are arranged in a direction generally parallel to a recording direction of said recording means.

23. An apparatus according to claim 17, wherein said first and said second holding means are arranged in a direction generally parallel to a recording direction of said recording means.

24. An apparatus according to claim 16, wherein said first and said second holding means are arranged one above the other.

25. An apparatus according to claim 16, wherein said ink sheet is driven by said drive means only in one direction.

26. An apparatus according to claim 16, wherein said recording means records dots and said apparatus further comprises means for transporting said recording medium, wherein after the first recording by said recording means has been effected, said recording medium is transported by said transporting means by a distance corresponding to a recording pitch and half a dot, and thereafter the second recording is effected.

27. An apparatus according to claim 17 further comprising means for transporting said recording medium, wherein before a second line of recording by said recording means after a first recording has been effected, said recording medium is transported by said transporting means by a distance corresponding to a recording pitch minus half a line.

28. An apparatus according to claim 16, wherein said recording means effects each line of recording with an upper printing data pattern and a lower printing data pattern being printed alternately in a normal direction and a reverse direction.

29. A recording apparatus for recording onto a recording medium, said apparatus comprising:

a mounting portion;

supply means mountable with said mounting portion and having an ink sheet;

wind-up means for winding up said ink sheet supplied from said supply means;

path means for guiding said ink sheet and comprising means defining a set of upper and lower paths which run in directions opposite to each other between said supply means and said wind-up means; and recording means reciprocally movable along the recording medium between said upper and said lower paths.

30. An apparatus according to claim 25, wherein said supply means, said wind-up means and said ink sheet are integrally assembled in a cassette.

31. A recording apparatus for recording onto a recording medium, said apparatus comprising:

an ink sheet cassette mounting portion;

an ink sheet cassette mountable with said mounting portion, said ink sheet cassette comprising supply means holding an ink sheet, wind-up means for winding-up said ink sheet supplied from said supply means, and path means for guiding the ink sheet fed from said supply means to said wind-up means and having means defining a set of upper and lower paths running in directions opposite to each other;

recording means reciprocally movable along said recording medium and comprising a heating portion; and transporting means for transporting said recording medium.

32. A cassette according to claim 31, wherein said ink sheet is fed from said supply means to said wind-up means only in one direction.

* * * * *

UNITED STATES PATENT AND TRADEMARK OFFICE
CERTIFICATE OF CORRECTION

PATENT NO. : 4,668,961 
DATED : May 26, 1987 
INVENTOR(S) : SOICHI HIRAMATSU

It is certified that error appears in the above-identified patent and that said Letters Patent is hereby corrected as shown below:

AT [56] UNDER REFERENCES CITED

U.S. Patent Documents, "728.050" should read --728,050--.

COLUMN 1

Line 20, "takeup" should read --take-up--.
Line 37, "print" should read --printing--.

COLUMN 3

Line 28, "FIG. 8," should read --FIG. 3,--.

COLUMN 5

Line 17, "row, the" should read --row position, the--.

COLUMN 6

Line 21, "Print" should read --Printing--.
Line 36, "apparatuses." should read --apparatus.--.
Line 47, "High-Quality Print" should read --High-Quality Printing--.
Line 61, "operations" should read --operation--.
Line 63, "print" should read --printing--.

COLUMN 7

Line 3, "print" should read --printing--.
Line 21, "print" should be deleted.
Line 37, "print" should read --printing--.

UNITED STATES PATENT AND TRADEMARK OFFICE

CERTIFICATE OF CORRECTION

PATENT NO. : 4,668,961

DATED : May 26, 1987

INVENTOR(S) : SOICHI HIRAMATSU

It is certified that error appears in the above-identified patent and that said Letters Patent is hereby corrected as shown below:

COLUMN 7

Line 39, "print," should read --printing,--.
Line 51, "print" should read --printing--.
Line 56, "print" should read --printing--.

COLUMN 8

Line 15, "What I claimed is:" should read --What I claim is:--.

COLUMN 10

Line 23, "line recording" should read --line of recording--.
Line 30, "claim 17," should read --claim 16,--.
Line 48, "claim 17 further" should read --claim 16, further--.

COLUMN 11

Line 7, "claim 25," should read --claim 29,--.

UNITED STATES PATENT AND TRADEMARK OFFICE
CERTIFICATE OF CORRECTION

PATENT NO. : 4,668,961

DATED : May 26, 1987

INVENTOR(S) : SOICHI HIRAMATSU

It is certified that error appears in the above-identified patent and that said Letters Patent is hereby corrected as shown below:

COLUMN 12

Line 1, "winding-up" should read --winding up--.

Signed and Sealed this

Twenty-second Day of December, 1987

*Attest:*

DONALD J. QUIGG

*Attesting Officer*

*Commissioner of Patents and Trademarks*